US011142158B2

(12) United States Patent
Schoemann et al.

(10) Patent No.: US 11,142,158 B2
(45) Date of Patent: Oct. 12, 2021

(54) VEHICLE INTERIOR TRIM ASSEMBLY

(71) Applicants: Michael P Schoemann, Waterford, MI (US); Richard Power, Oxford, MI (US); Brian Begg, Lake Orion, MI (US)

(72) Inventors: Michael P Schoemann, Waterford, MI (US); Richard Power, Oxford, MI (US); Brian Begg, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 49 days.

(21) Appl. No.: 16/601,689

(22) Filed: Oct. 15, 2019

(65) Prior Publication Data

US 2021/0107423 A1    Apr. 15, 2021

(51) Int. Cl.
  *B60R 21/215*    (2011.01)
  *B60R 21/2338*   (2011.01)

(52) U.S. Cl.
  CPC ........ *B60R 21/215* (2013.01); *B60R 21/2338* (2013.01)

(58) Field of Classification Search
  CPC . B60R 21/213; B60R 21/215; B60R 21/2336; B60R 21/2338
  See application file for complete search history.

(56) References Cited

U.S. PATENT DOCUMENTS

| 6,893,043 | B2 | 5/2005 | Fischer et al. |
| 7,922,189 | B1* | 4/2011 | Dillon .................. B60R 21/213 |
| | | | 280/728.1 |
| 8,540,279 | B2 | 9/2013 | Jun |
| 2002/0167152 | A1 | 11/2002 | Preisler et al. |
| 2004/0178609 | A1 | 9/2004 | Totsuka et al. |
| 2007/0241542 | A1* | 10/2007 | Wallace ................. B60R 13/02 |
| | | | 280/730.2 |
| 2011/0221170 | A1* | 9/2011 | Thurston ............... B60R 13/025 |
| | | | 280/728.1 |

FOREIGN PATENT DOCUMENTS

| KR | 20120024007 A | 3/2012 |
| KR | 20140084977 A | 7/2014 |

* cited by examiner

Primary Examiner — Paul N Dickson
Assistant Examiner — Scott F. Underwood
(74) Attorney, Agent, or Firm — Ralph E. Smith

(57) ABSTRACT

A vehicle trim piece assembly for an interior of a vehicle includes a mount and a trim piece coupled to the mount. The trim piece has an inboard surface and an outboard surface, at least one projection extending from the outboard surface in a first direction to an outer surface, and a guard extending from the outboard surface in the first direction to a location beyond the outer surface. The projection is received within the at least one opening to secure the trim piece to the mount. In use, an airbag tether engages the guard which directs the tether over the projection so that the tether does not become snagged on the projection.

20 Claims, 6 Drawing Sheets

VEHICLE INTERIOR TRIM ASSEMBLY

FIELD

The present disclosure relates to a vehicle interior trim assembly that covers an airbag.

BACKGROUND

Vehicles include airbags mounted behind interior trim panels. The airbags are sometimes tethered to the vehicle body and the airbags and tethers displace the trim panels when the airbags are deployed. Such displacement occurs rapidly and snagging or other undesired interference from the trim panels or vehicle structural components during airbag deployment can affect the effective volume or shape of the airbag and result in a failure of the airbag to fully or effectively deploy.

SUMMARY

In at least some implementations, a vehicle trim piece assembly for an interior of a vehicle includes a mount and a trim piece. The mount is adapted to be secured to a vehicle behind a trim piece, the mount has an inboard surface that, when the mount is secured to the vehicle, faces an interior of the vehicle, and the mount has at least one opening. The trim piece has an inboard surface adapted to face the interior of the vehicle and an outboard surface on the opposite side as the inboard surface, and at least one projection extending from the outboard surface in a first direction to an outer surface. The trim piece has a guard extending from the outboard surface in the first direction to a location beyond the outer surface. The at least one projection is received within the at least one opening to secure the trim piece to the mount with the outboard surface of the trim piece covering the inboard surface of the mount. The guard is arranged at or adjacent to a junction defined between the mount and the trim piece, the junction extending in a second direction that is not parallel to the first direction and wherein the guard extends in the second direction from a first end spaced from the projection in the second direction to a second end at the projection or on the opposite side of the projection as the first end.

In at least some implementations, a connector is releasably secured to the at least one projection and overlaps a portion of the mount from within the at least one opening to secure the trim piece to the mount. The connector may be a clip that snaps into the opening or otherwise provides an interference fit within the opening. The clip may become separated from the projection when an airbag is deployed and the trim piece is separated from the mount.

In at least some implementations, the first direction is a cross-car direction defined between driver and passenger sides of the vehicle, and the second direction is a vertical direction defined between a roof and floor of the vehicle. In at least some implementations, the at least one opening is in a surface of the mount that faces in the first direction and extends in the second direction. The at least one projection may intersect a plane that includes the junction between the mount and the trim piece and which extends in the second direction and a third direction that is perpendicular to the first direction and the second direction.

In at least some implementations, the first end of the guard is inclined and has a portion that projects less in the first direction from the outboard surface than another portion.

The first end of the guard may define part of a lead-in area that includes an open space between part of the mount and part of the trim piece.

In at least some implementations, two guards are provided with a first guard spaced from the projection in a third direction that is not parallel to either the first direction or the second direction, and a second guard spaced from the projection in the third direction and located on the opposite side of the projection as the first guard. In at least some implementations, the guard is aligned with at least one projection in a third direction that is not parallel to either the first direction or the second direction.

In at least some implementations, an assembly for a vehicle having a body includes a mount adapted to be secured to the vehicle body and having at least one opening, a trim piece and an airbag. The trim piece has an inboard surface adapted to face an interior of the vehicle and an outboard surface on the opposite side as the inboard surface, at least one projection extending from the outboard surface in a first direction to a free end, and a guard extending from the outboard surface in the first direction to a location beyond the free end. The airbag has a tether adapted to be coupled to the vehicle body and arranged for movement along a junction between the trim piece and the mount. At least one projection is received within the at least one opening to secure the trim piece to the mount and the guard is arranged at or adjacent to the junction so that upon deployment of the airbag the tether slides along the guard from a first position spaced from the projection to a second position over the projection.

In at least some implementations, a connector is releasably secured to the at least one projection and overlaps a portion of the mount from within the at least one opening to secure the trim piece to the mount.

In at least some implementations, the guard includes an outer surface, and the outer surface is at the same distance from the outboard surface along the length of the outer surface, or a transition between adjacent sections of the outer surface are at an angle of not more than 60 degrees, and in some implementations, 45 degrees. At least a portion of the outer surface may be inclined relative to the outboard surface and extend from a first end closer to the outboard surface to an end spaced farther from the outboard surface than the first end. In at least some implementations, at least a portion of the guard is aligned with the projection in a second direction that is perpendicular to the first direction.

In at least some implementations, two guards are provided, each guard extends in a second direction perpendicular to the first direction, and one guard is disposed on each of two opposite sides of the projection, and the guards are spaced from the projection in a third direction perpendicular to the first direction and the second direction.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
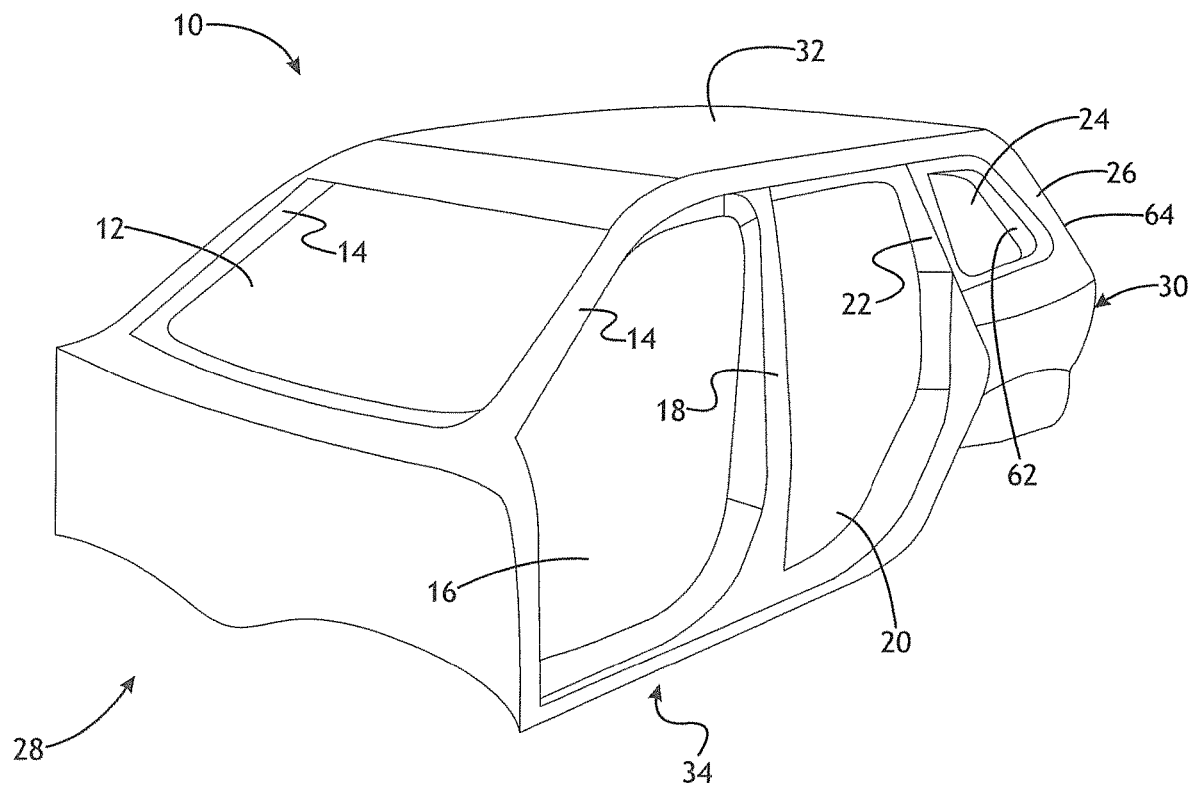
FIG. 1 is a perspective view of a portion of a vehicle body.

Referring in more detail to the drawings, FIG. 1 illustrates a portion of a vehicle body 10, sometimes called a body-in-white, that includes structural members for mounting various vehicle components like doors, windows and the like. The body 10 includes a windshield opening 12 defined between spaced apart A-pillars 14, front door openings 16 on opposite sides of the vehicle for driver side and passenger side front doors between the A-pillars 14 and B-pillars 18, rear door openings 20 between the B-pillars 18 and C-pillars 22, and a rear window opening 24 between the C-pillars 22 and D-pillars 26. The two A-pillars 14 are spaced apart in a cross-car direction that extends from the driver side to the passenger side, as are the two B, C and D-pillars 18, 22, 26. The vehicle body 10 has a front (not fully shown, denoted by reference numeral 28 in FIG. 1) and a rear 30 that are spaced apart in a fore-aft direction that is perpendicular to the cross-car direction. And the vehicle has a roof 32 and a floor 34 spaced apart in a vertical direction that is perpendicular to both the fore-aft and cross-car directions.

Figure 2:
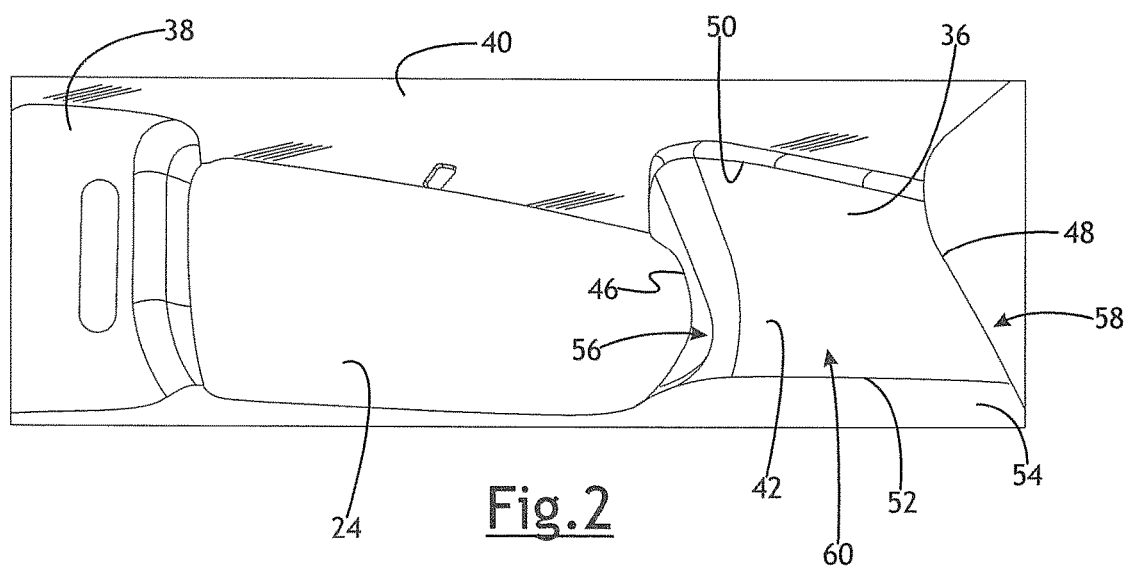
FIG. 2 is a perspective view of interior trim panels or trim pieces of the vehicle body.
Figure 3:
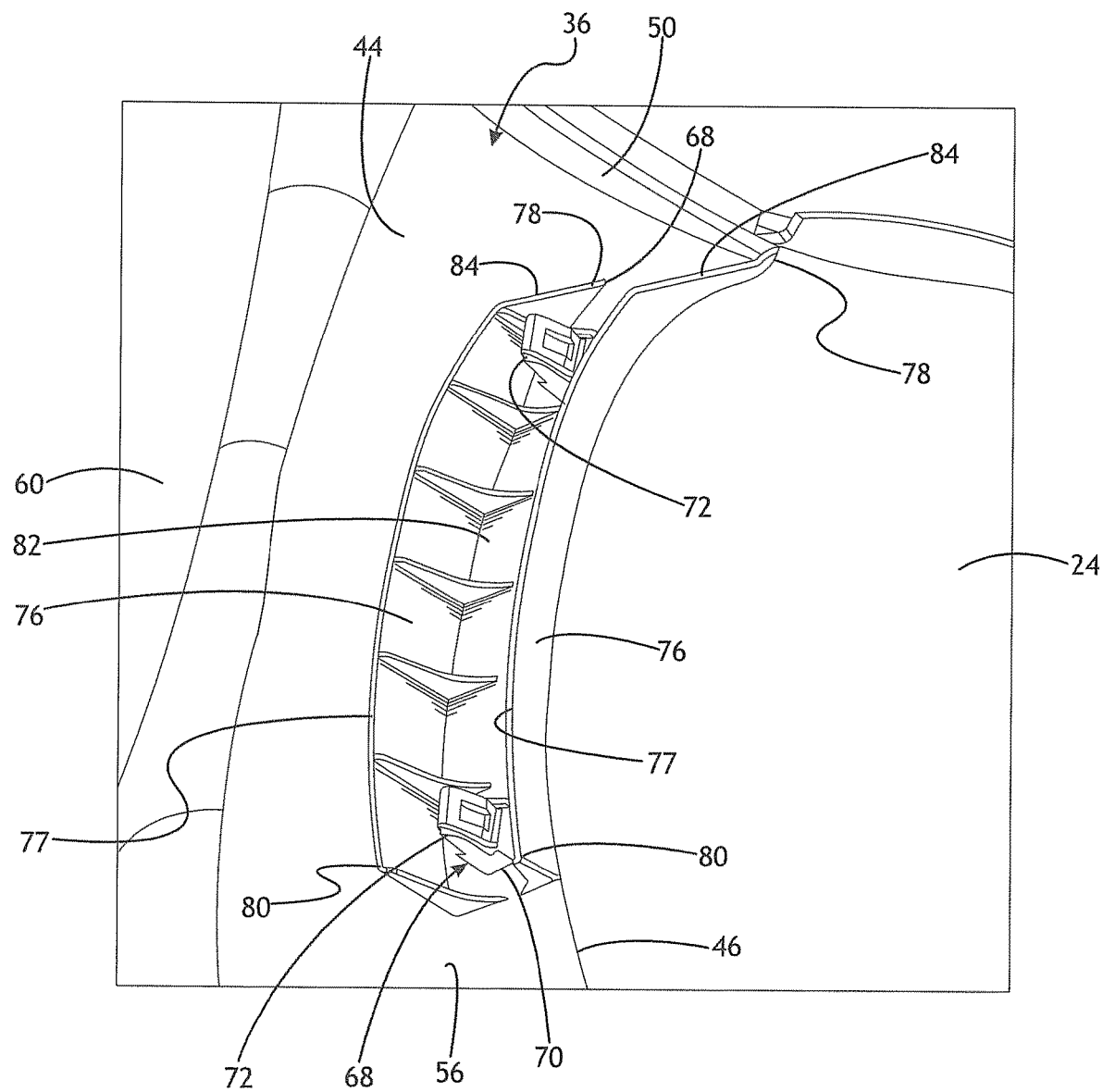
FIG. 3 is an enlarged, fragmentary perspective view of an outboard surface of a trim panel, such as a D-pillar trim piece.

As shown in FIG. 2, one or more trim panels or trim pieces may cover various structural components of the body 10, such as a D-pillar trim piece 36 that covers at least part of the D-pillar 26, a C-pillar trim piece 38 over at least part of the C-pillar 22, and a headliner 40 that covers at least a portion of the roof 32. The trim pieces 36, 38, 40 have front or inboard surfaces 42 that face toward a passenger compartment of the vehicle that is defined inboard of or between the sets of pillars, and between a windshield and the rear 30 of the vehicle. And the trim pieces 36, 38, 40 have rear or outboard surfaces 44 on the opposite side as the inboard surfaces 42. The inboard surface 42 of the trim piece 36 may define a so-called show surface that is directly visible by occupants of the vehicle, or other trim piece(s) (e.g. fabric) may cover the trim piece 36 and define the show surface or part thereof, as desired. The outboard or rear surface 44 of the D-pillar trim piece 36 is shown in FIG. 3. The trim piece 36 also includes a front edge 46 that is closer to the front of the vehicle than is a rear edge 48 (shown in FIG. 2), an upper edge 50 at or adjacent to the headliner 40, and a lower edge 52 (FIG. 2) that is at or adjacent to a body trim piece 54 which covers the vehicle body beneath the rear window opening 24. The trim piece 36 may be contoured with forward and rearward sections 56, 58 extending inwardly in the cross-car direction from the front and rear edges 46, 48, to a center section 60 with the forward and rearward sections 56, 58 received adjacent to front and rear sides 62, 64 (FIG. 1), respectively, of the D-pillar 26 and the center section 60 overlying an inward facing middle surface 66 (FIGS. 4 and 5) of the D-pillar 26.

To facilitate coupling the trim piece 36 to another component, the trim piece 36 includes at least one projection 68 that may be cantilevered from the outboard surface 44 with a first end 70 coupled to or formed with the outboard surface 44 and a second end 72 that may be spaced from the remainder of the outboard surface 44. In the example shown, the trim piece 36 includes two spaced projections 68 providing two attachment points although only one or more than two projections 68 or attachment points may be provided. The projections 68 may be of the same or different size and shape, as desired. In at least some implementations, the projections 68 extend from the outboard surface 44 in a first direction, which may be in the fore-aft direction or generally in the fore-aft direction such that the projections 68 are inserted into a corresponding connection feature/void generally in the fore-aft direction. The projections 68 could instead be oriented in the cross-car direction or generally in the cross-car direction in which case the projections 68 may be inserted or received into voids facing inwardly, in the cross-car direction toward the passenger compartment. As used herein, the term "generally" when used with a direction is intended to include features oriented in the stated direction or within 30 degrees of the stated direction, so generally in the cross-car direction includes things exactly in the cross-car direction and things inclined up to 30 degrees in one or both of the vertical and fore-aft directions from the cross-car direction. In the example shown in FIGS. 2-6, the projections 68 extend from the forward section of the D-pillar 26 which extends in the cross-car direction, and the projections 68 themselves extend in the fore-aft direction.

The trim piece 36 also includes at least one guard 76 extending from the outboard surface 44 in the first direction to an outer surface 77 at least a portion of which is spaced from the outboard surface 44 in the first direction at least as far as the projections 68. The guard 76 may extend in a second direction, such as the vertical direction, from a first end 78 toward a second end 80, and the guard 76 may overlap at least one projection 68 in the second direction. The guard 76 may be offset from the projections 68 in a third direction (e.g. in the cross-car direction when the projections 68 extend in the fore-aft direction, or in the fore-aft direction when the projections 68 extend in the cross-car direction).

Figure 7:
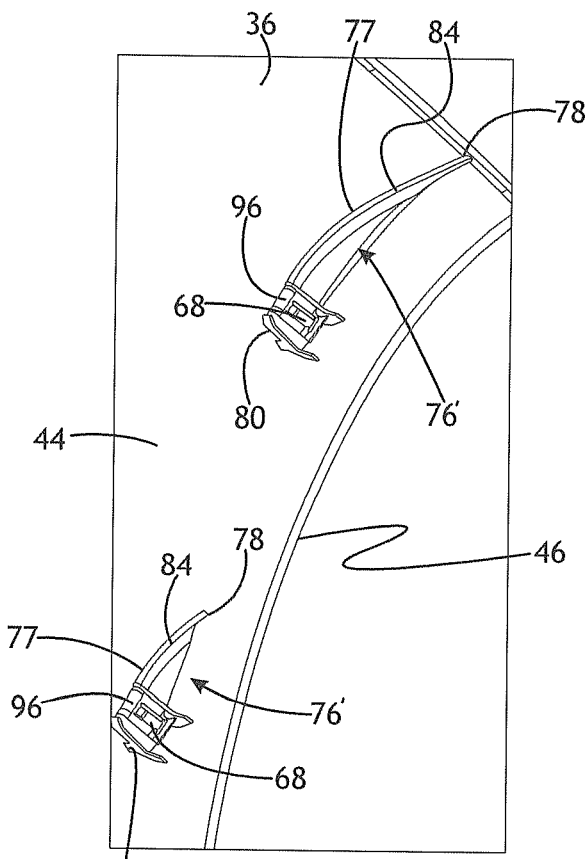
FIG. 7 is an enlarged fragmentary view of the outboard surface of a trim piece including two projections and associated guards.
Figure 8:
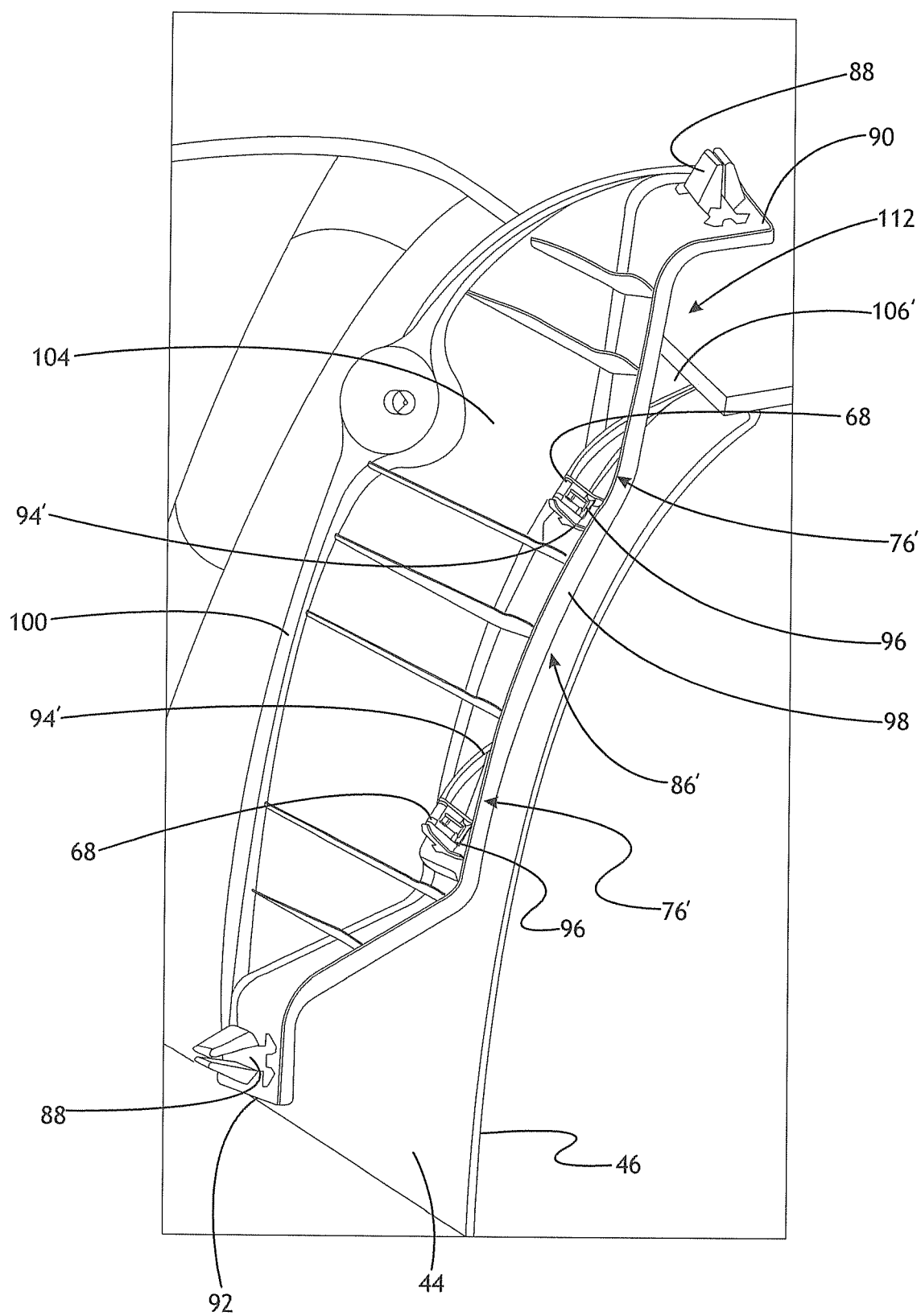
FIG. 8 is a view similar to FIG. 7 and including a mount to which the trim piece is coupled.

In FIG. 3, two guards 76 are shown, both formed in the forward section 56 of the trim piece 36 next to the projections 68. A first guard 76 is closer to the front edge 46 of the trim piece 36 than is a second guard 76, both guards 76 are spaced from each other and from the projections 68 in the cross-car direction (e.g. the third direction) providing an open space 82 between the guards 76 in which the projections 68 are located. Both guards 76 extend vertically (e.g. the second direction) from first ends 78 to second ends 80 and both projections 68 are located between the ends of the guards 76 in the second direction and also the third direction. That is, each guard 76 extends vertically above and below each projection 68. While two guards 76 are shown, implementations with only one guard 76 may be used and the guard 76 may be on either side of the projections 68 (e.g. in the position of either of the first guard or second guard), or the guard 76' may be aligned with the projection(s), such as is shown in the implementation of FIGS. 7-8 which will be described in more detail later.

The outer surface 77 of one or both guards 76 may extend to the first end 78 which may blend into or be relatively smoothly joined with the outboard surface 44 of the trim piece 36 and an inclined portion 84 that gradually extends further in the first direction from the trim piece 36, and which may extend in the second direction from the first end 78 at least part of the way to the projection 68. The outer surface 77 may be relatively smooth without significant steps or interruptions in its surface, with any transitions between adjacent sections at different distances from the outboard surface 44 being arranged at an angle of less than 60 degrees, and in some implementations 45 degrees, relative to each other. In at least some implementations, such as is shown in FIGS. 3 and 6, the guards 76 extend in the second direction beyond the projections 68 in a continuous manner without gaps in either guard 76 so that an airbag tether or other component sliding along the outer surface 77 of the guard 76 does not become snagged on the guard 76 or the projection 68, as will be discussed in more detail below.

Figure 4:
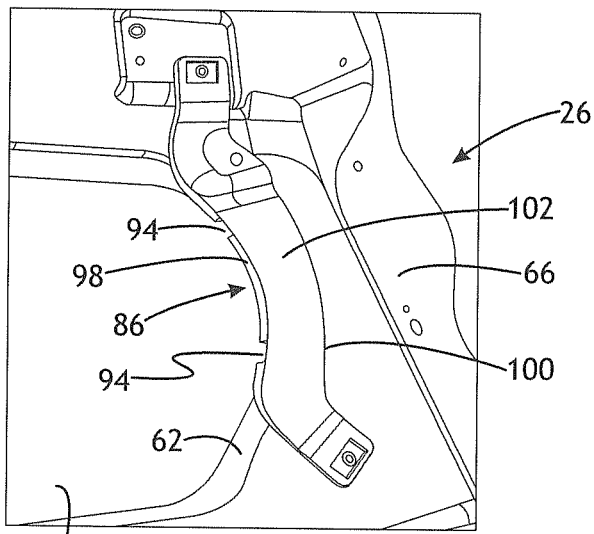
FIG. 4 is a perspective view of a mount secured to the vehicle body, showing an inboard surface of the mount.
Figure 5:
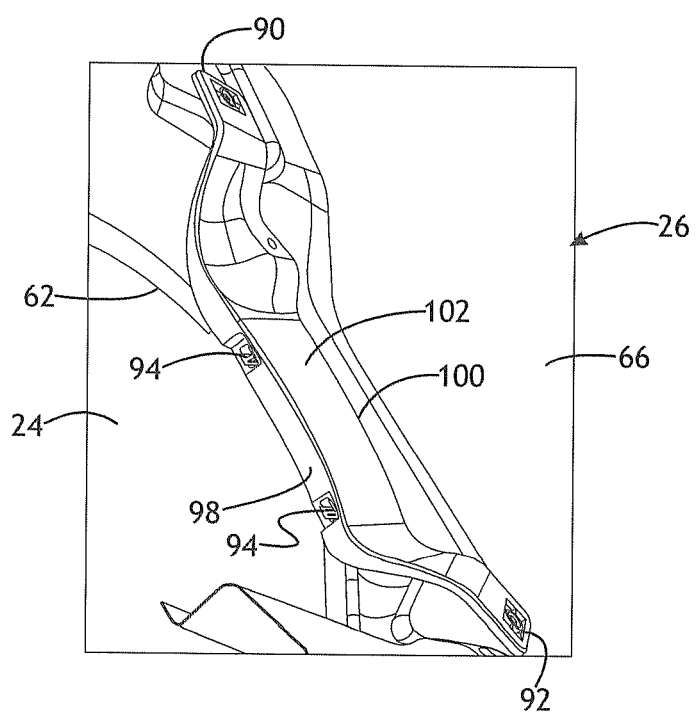
FIG. 5 is a perspective view of the mount similar to FIG. 4 and showing a front surface of the mount and openings formed therein.
Figure 6:
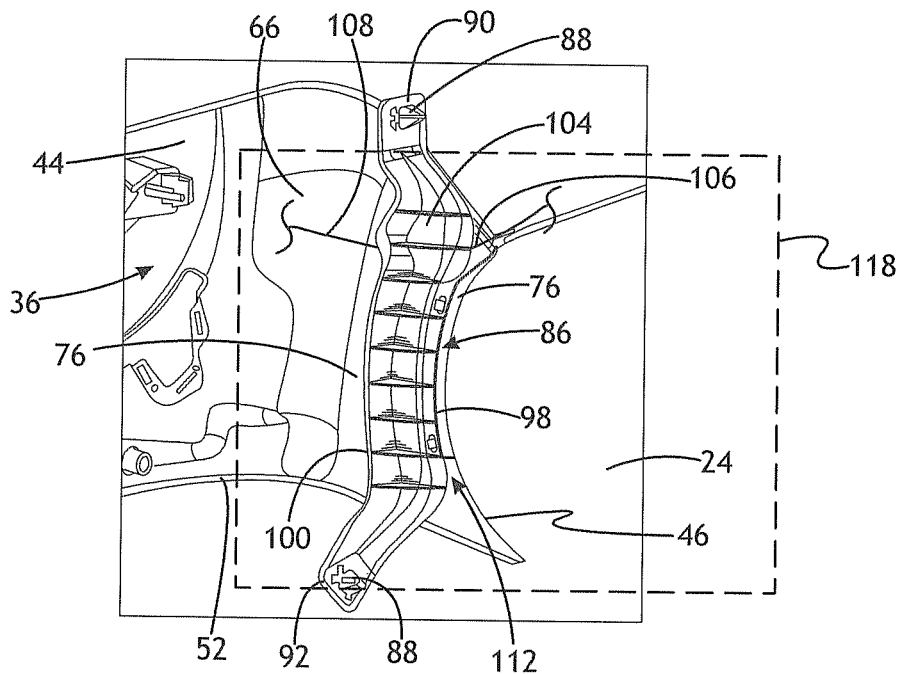
FIG. 6 is a perspective view of the mount and trim piece coupled together, showing outboard surfaces of the mount and trim piece.

To facilitate coupling the trim piece 36 to the vehicle body 10, a mount 86 may be provided, as shown in FIGS. 4-6 and 8-10. The mount 86 may be a separate component, like a bracket, that is fixed to the body 10 such as by one or more fasteners 88 as shown in FIG. 6 (e.g. screws, bolts, rivets, snap-fit or friction fit connectors) or a weld, or the mount 86 may be a region or portion of a piece of the body 10. In the implementations shown, the mount 86 is a bracket that is coupled at opposed first and second ends 90, 92 that are spaced apart generally in the vertical direction (with the first end being closer to the roof 32 than the second end). The mount 86 includes one or more connection features that are adapted to be mated with the projections 68 to couple the trim piece 36 to the mount 86. In at least some implementations, the connection features include openings 94 constructed to receive at least part of the projections 68 in a friction fit, snap-fit, or other secure manner to maintain the trim piece 36 coupled to the mount 86 in normal use of the vehicle and until such time as separation of these components is desired. In the implementation shown, connectors 96 are received on the projections 68 and the connectors 96 are snap-fit to the mount 86 within the openings 94, to releasably secure the trim piece 36 to the mount 86.

The mount 86 includes forward and rearward surfaces 98, 100 respectively, with the forward surface 98 being closer to the front 28 of the vehicle than the rear 30, and inboard and outboard surfaces 102, 104 with the inboard surface 102 shown in FIGS. 4 and 5 and generally facing toward the passenger compartment and the outboard surface 104 shown in FIG. 6 and generally facing the vehicle exterior. With the projections 68 formed in the forward section 56 of the trim piece 36 and extending from the outboard surface 44 of the trim piece 36 in a fore-aft direction (e.g. the second end 72 is closer to the rear of the vehicle than is the first end 70), the openings 94 in the mount 86 may be formed in the forward surface 98 of the mount 86. So arranged, the projections 68 are inserted into the openings 94 in a fore to aft direction of movement until the connectors 96 are firmly seated in the mount 86.

When coupled together, as shown in FIG. 6, the first guard 76 is adjacent to one side of the forward surface 98 of the mount 86 and the second guard 76 (not shown in FIG. 6) is adjacent to the opposite side of the forward surface 98 of the mount 86, and the projections 68 are at least partially received in the openings 94 of the mount 86. Thus, the first guard 76 is spaced from the projection 68 in a third direction that is not parallel to either the first direction or the second direction, and the second guard 76 is spaced from the projection 68 in the third direction and located on the opposite side of the projection 68 as the first guard 76. Further, the first end 78 and at least part of the inclined portion 84 of at least one guard 76 may be spaced from the forward surface 98 of the mount 86 providing a lead-in area 106 (FIG. 6) between the guard 76 and mount 86. As shown in FIG. 6, a tether 108 for an airbag 110 (FIGS. 9 and 10) may extend through the lead-in area and between the mount 86 and trim piece 36 in the normal, not deployed position of the airbag 110.

In the example shown in FIGS. 7 and 8, a single guard 76' is provided adjacent to at least one, and up to each projection 68. In this example, components or features that are similar to components or features already described with reference to FIGS. 1 to 6 will be given the same number or include a prime symbol after the reference number to avoid repeating the description of the same or similar components and facilitate the description of this embodiment. In this implementation, each guard 76' is aligned with a respective one of the projections 68 and/or leads to and overlaps the respective projection 68 in at least one direction, shown as the vertical direction. An upper or first end 78 of each guard 76' blends or is relatively smoothly joined with the outboard surface 44 of the trim piece 36 and each guard 76' may have an inclined portion 84 that extends from the first end 78 at least part of the way to its respective projection 68. In at least some implementations, each guard 76' extends all the way from the first end 78 to its respective projection 68 with no gap between them, or with a gap that is smaller than the width of an airbag tether 108, so that an airbag tether sliding along the guard 76' does not fall into the gap and become snagged on the projection 68. In at least some implementations, at least a portion of each guard 76' may extend outwardly in the first direction at least as far as or beyond its respective projection 68 and/or as far as or beyond a clip or connector coupled to the projection, as shown in FIG. 7. Hence, an airbag tether 108 or other component sliding along the guards 76' is less likely to engage the projections 68, and is more likely to pass by the projections 68 uninhibited by the projections 68.

When coupled to the mount 86', as shown in FIG. 8, each projection 68 and a portion of the guard 76' associated therewith may extend through an opening 94' in the mount 86' (there may be one or more openings 94', and the example shown includes a separate opening 94' for each projection 68), with the first end 78 and part of the inclined portion 84 adjacent to the first end received outboard of the opening 94' and spaced from the mount 86'. The connector 96 on each projection 68 is passed at least partially through the opening 94', overlaps the outboard surface 104 of the mount 86' and inhibits separation of the trim piece 36 from the mount 86'. Further, the first end 78 and at least part of the inclined portion 84 of the guard 76' may be spaced from the forward surface 98 of the mount 86 providing a lead-in area 106' between the guard 76' and mount 86'. And as shown in FIG. 8, the airbag tether 108 may extend through the lead-in area 106' and between the mount 86' and trim piece 36' in the normal, not deployed position of the airbag 110.

Figure 9:
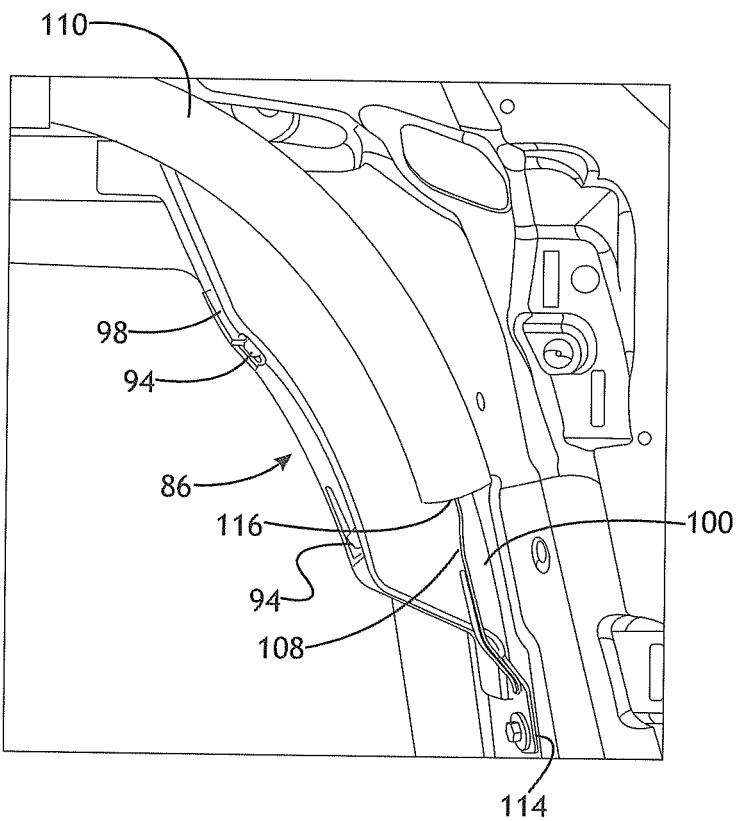
FIG. 9 is a fragmentary perspective view showing a pillar of the vehicle body, a portion of an airbag and its tether, and the mount coupled to the pillar.

FIG. 9 shows the airbag 110 and its tether 108 that is mounted to the D-pillar 26 of the vehicle body 10. The airbag 110 is in its not deployed state or position and is generally rolled or folded and received outboard of one or more trim pieces in or defining boundaries of the passenger compartment. In this state, the airbag 110 generally is not visible to passengers within the passenger compartment. In the example shown, part of the airbag 110 is behind the D-pillar trim piece 36 and the headliner of the vehicle, and the airbag 110 may extend forward between the headliner 40 and vehicle roof 32 as far as desired, including up to the A-pillar 14 or forward most pillar of the vehicle. The airbag 110 may include another tether (now shown) or a forward portion of the airbag 110 that is tethered to the vehicle body 10 at the forward end of the airbag 110. The tethers 108 limit travel of the airbag 110 as the airbag 110 is deployed, to provide the airbag 110 in a desired position within the vehicle when deployed.

Figure 10:
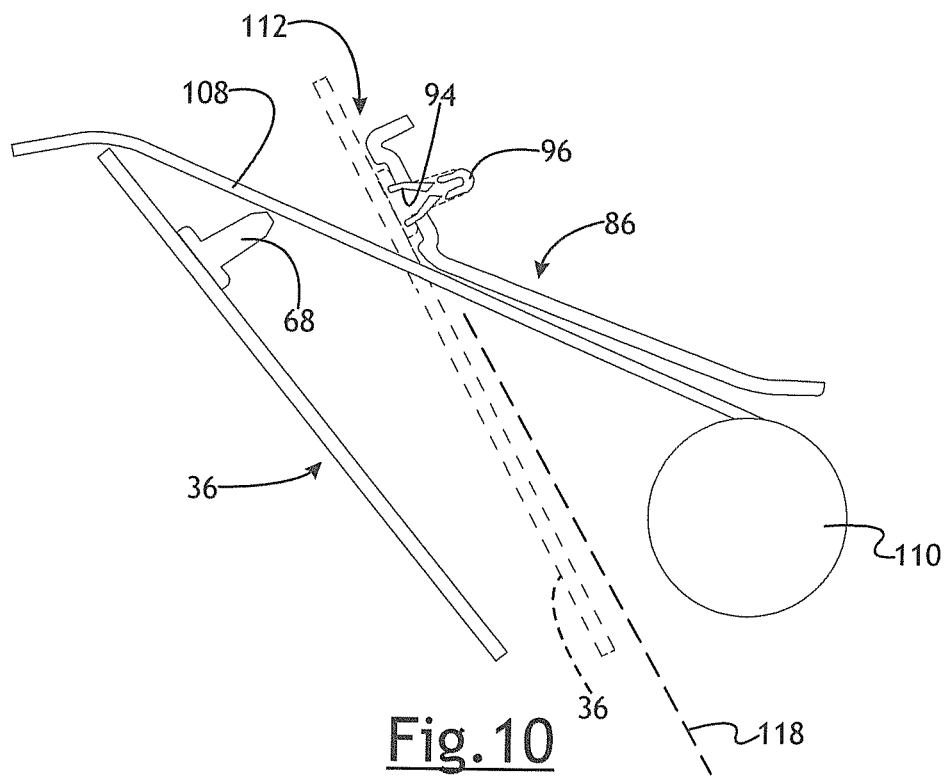
FIG. 10 is a diagrammatic sectional view showing the airbag tether separating the trim piece from the mount as the airbag is deploying.

As the airbag 110 is deployed, the airbag 110 moves from behind the trim pieces to its deployed position with at least part of the airbag 110 received within the passenger compartment. In doing so, the airbag 110 may displace part of the headliner 40 and other trim pieces 36, 38. As shown in FIG. 10, the D-pillar trim piece 36 may be dislodged from the mount 86 by one or both of the tether 108 and the airbag 110. As the airbag 110 is deployed, the tether 108 becomes taught and moves relative to the trim piece 36 and mount 86, along or between a junction 112 defined between the trim piece 36 and mount 86. The tether 108 moves from a first position shown in FIG. 8 with the tether 108 received in the lead-in area 106 to a second position, and between the first and second positions, the tether 108 slides over the guard(s) and adjacent surface(s) of the mount 86, and past the projections 68.

During this movement, the tether 108 moves along the junction 112 or area of overlap between the mount 86 and trim piece 36 and separates the trim piece 36 from the guard 76 which causes the connectors 96 to break or otherwise release from the projections 68 so that the projections 68 may be moved out of the openings 94 in the mount 86, to permit the trim piece 36 to detach from the mount 86. In FIG. 10, the position of the trim piece 36 prior to airbag deployment is shown in dashed lines and a position of the trim piece 36 as the airbag 110 is deploying, wherein the trim piece 36 is no longer connected to the mount 86, is shown in solid lines. With the trim piece 36 disconnected from the mount 86, the airbag 110 can expand with less interference from the trim piece 36 and more quickly reach its deployed position between vehicle passengers and the A, B, C and/or D pillars, windows and related structures along the sides of the vehicle.

Thus, the tether 108 or other portion of the airbag 110 has a first end 114, which may be coupled to the vehicle body 10, and a second end 116 connected to the airbag 110, and a path of travel during airbag deployment, with at least a portion of the path of travel being along the junction 112 (where the lead-in area may define part of the junction 112 or be open to the junction 112) between the mount 86 and trim piece 36, and defined in part by the outer surface 77 of the guard 76. Further, the projections 68 are generally within or adjacent to the path of travel of a portion of the tether 108 (or other portion of the airbag 110), with one portion of the tether 108 (or other portion of the airbag 110) on one side of the projections 68 and another portion of the tether 108 (or other portion of the airbag 110) on the opposite side of the projections 68. In at least some implementations, at least one projection 68 intersects a plane 118 (FIGS. 6 and 10) that includes or intersects at least part of the junction 112 between the mount 86 and the trim piece 36 and which extends in the second direction and the third direction. However, during movement of the tether 108, the tether 108 engages the guard(s) (e.g. the outer surface(s) 77 thereof) which prevents the tether 108 (or other portion of the airbag 110) from engaging or become snagged on the projections 68 as the tether 108 moves along its path of travel.

In at least some implementations, the path of travel may be defined by a line that extends generally in a third direction, where the projection 68 and guard 76 extend outwardly in the first direction (which is fore-aft in the example shown) and wherein the line or tether 108 moves generally in the second direction (which is vertical in the example shown) along the guard 76 and/or forward surface of the mount 86, recognizing that the line may move along a curved/non-linear path that is not entirely parallel to the second direction and which may include vectors or portions angled or in the first and/or third directions. The tether 108 is under tension when the airbag deploys, as the tether 108 restrains and guides the expansion of the airbag 110, so a straight line may represent the tether 108 as it moves along its path of movement, or the line may be curved as the tether 108 is engaged with one or both of the mount 86 and trim piece 36 (e.g. a guard 76), and the line may be a centerline of the tether 108. The projection 68 may define part of a junction or area of overlap between the mount 86 and the trim piece 36, and the guard 76 may be arranged at or adjacent to the junction. In other words, in at least some implementations, in the third direction there is no structure between the projection 68 and the guard 76 that extends in the first direction from the outboard surface 44 of the trim piece 36 farther than the guard 76. The junction between the mount 86 and trim piece 36 extends in a second direction that is not parallel to the first direction and the guard 76 extends in the second direction from the first end spaced from the projection 68 in the second direction to a second end that is either at the projection 68 or on the opposite side of the projection 68 as the first end. At least part of at least one guard 76 defines a portion of the path of travel of the tether 108 and maintains the path of travel of the tether 108 spaced from at least one projection 68.

In at least some implementations, without the guard(s), the path of travel would intersect one or more projections 68. The projections 68 extend through or overlap in the first direction the surface of the mount 86 over which the tether 108 slides. A portion of the tether 108 between the first and second ends of the tether 108 slides over the forward surface of the mount 86 and the guard, the guard 76 tends to bend the tether 108 between its ends and the resulting force the tether 108 provides on the trim piece 36 via the guard(s) disconnects the projections 68 from the mount 86. This force separates the trim piece 36 from the mount 86 so that, as the tether 108 slides down the mount 86, each projection 68 is removed from the mount 86 before the tether 108 slides over the corresponding portion of the mount 86, and the guard 76 keeps the tether 108 away from the projections 68 and the projections 68 are not in the path of movement of the tether 108. This enables the tether 108 to separate the trim piece 36 from the mount 86 (and/or headliner or other component) without snagging on the point of connection of the trim piece 36 (e.g. the projections 68) with the mount 86, which in turn permits the airbag 110 to inflate or deploy as intended.

What is claimed is:

1. A vehicle interior trim assembly, comprising:
   a mount adapted to be secured to a vehicle body, the mount having an inboard surface that, when the mount is secured to a vehicle, faces an interior of the vehicle, and the mount has at least one opening;
   a trim piece having an inboard surface adapted to face the interior of the vehicle and an outboard surface on an opposite side as the inboard surface of the trim piece, the trim piece including at least one projection extending from the outboard surface in a first direction to a free end and a guard extending from the outboard surface in the first direction to a location beyond the free end, wherein the at least one projection and a portion of the guard is received within the at least one opening to secure the trim piece to the mount with the outboard surface of the trim piece covering the inboard surface of the mount, and wherein the guard is arranged at or adjacent to a junction defined between the mount and the trim piece, the junction extending in a second direction that is not parallel to the first direction and wherein the guard extends in the second direction from a first end spaced from the projection in the second direction to a second end at the projection.

2. The assembly of claim 1 which also includes a connector releasably secured to the at least one projection and overlapping a portion of the mount from within the at least one opening to secure the trim piece to the mount.

3. The assembly of claim 1 wherein the first direction is a cross-car direction defined between driver and passenger sides of the vehicle.

4. The assembly of claim 3 wherein the second direction is a vertical direction defined between a roof and floor of the vehicle.

5. The assembly of claim 1 wherein the at least one opening is in a surface of the mount that faces in the first direction and extends in the second direction.

6. The assembly of claim 5 wherein the at least one projection intersects a plane that includes or intersects the junction between the mount and the trim piece and which extends in the second direction and a third direction that is perpendicular to the first direction and the second direction.

7. The assembly of claim 1 wherein the first end of the guard is inclined and has a portion that projects less in the first direction from the outboard surface than another portion.

8. The assembly of claim 7 wherein the first end of the guard defines part of a lead-in area that includes an open space between a part of the mount and a part of the trim piece.

9. The assembly of claim 1 wherein the guard is aligned with at least one projection in a third direction that is not parallel to either the first direction or the second direction.

10. A vehicle interior trim assembly, comprising:
a mount adapted to be secured to a vehicle body, the mount having an inboard surface that, when the mount is secured to a vehicle, faces an interior of the vehicle, and the mount has at least one opening;
a trim piece having an inboard surface adapted to face the interior of the vehicle and an outboard surface on an opposite side as the inboard surface of the trim piece, the trim piece including at least one projection extending from the outboard surface in a first direction to a free end, a first guard extending from the outboard surface in the first direction to a location beyond the free end, and a second guard extending from the outboard surface in the first direction to a location beyond the free end, wherein the at least one projection is received within the at least one opening to secure the trim piece to the mount with the outboard surface of the trim piece covering the inboard surface of the mount, and wherein the first guard extends in a second direction that is not parallel to the first direction from a first end of the first guard spaced from the projection in the second direction to a second end of the first guard that is located on the opposite side of the projection as the first end, the second guard extends in the second direction from a first end of the second guard that is spaced from the projection in the second direction to a second end of the second guard that is located on the opposite side of the projection as the first end of the second guard, and the projection is located between the first guard and the second guard and the projection is spaced from both the first guard and the second guard in a third direction that is not parallel to either the first direction or the second direction.

11. The assembly of claim 10 wherein the first end of the first guard and the first end of the second guard are spaced from the mount in the first direction with an open space defined between the mount and the portion of the trim piece that includes the first end of the first guard and the first end of the second guard.

12. The assembly of claim 11 wherein the first end of the first guard and the first end of the second guard both have an inclined portion that projects less in the first direction from the outboard surface than another portion, and wherein the inclined portion of both the first guard and the second guard extend toward and overlaps the mount at a location that defines a boundary of the open space.

13. An assembly for a vehicle having a body, comprising:
a mount adapted to be secured to the vehicle body and having at least one opening;
a trim piece having an inboard surface adapted to face an interior of the vehicle and an outboard surface on an opposite side as the inboard surface of the trim piece, the trim piece including at least one projection extending from the outboard surface in a first direction to a free end and a guard extending from the outboard surface in the first direction to a location beyond the free end; and
an airbag having a tether adapted to be coupled to the vehicle body and arranged for movement along a junction between the trim piece and the mount, wherein the at least one projection is received within the at least one opening to secure the trim piece to the mount and wherein a first end of the guard is spaced from the projection in a second direction that is not parallel to the first direction and the first end of the guard is spaced from the mount in the first direction defining a lead-in area that includes an open space between a part of the mount and a part of the trim piece that includes the first end of the guard, and wherein the tether extends through the lead-in area between the mount and trim piece.

14. The assembly of claim 13 which also includes a connector releasably secured to the at least one projection and overlapping a portion of the mount from within the at least one opening to secure the trim piece to the mount.

15. The assembly of claim 13 wherein the guard includes an outer surface, and the outer surface is at the same distance from the outboard surface along the length of the outer surface, or a transition between adjacent sections of the outer surface are at an angle of not more than 60 degrees relative to each other.

16. The assembly of claim 15 wherein at least a portion of the outer surface is inclined relative to the outboard surface and extends from a first end closer to the outboard surface to an end spaced farther from the outboard surface than the first end.

17. The assembly of claim 13 wherein two guards are provided, and the two guards include a first guard which is the guard recited in claim 1 and a second guard spaced from the first guard, both the first guard and the second guard extending in the second direction perpendicular to the first direction, and with the first guard disposed adjacent to one side of the projection and the second guard disposed adjacent to an opposite side of the projection as the first guide, and with the guards spaced from the projection in a third direction perpendicular to the first direction and the second direction.

18. The assembly of claim 13 wherein at least a portion of the guard is aligned with the projection in the second direction that is perpendicular to the first direction.

19. The assembly of claim 13 wherein a portion of the guard is received within the at least one opening.

20. The assembly of claim 13 wherein at least a portion of the guard is aligned with the projection in a third direction that is perpendicular to the first direction and the second direction.

* * * * *